United States Patent [19]

Imanaka

[11] Patent Number: 5,790,172
[45] Date of Patent: Aug. 4, 1998

[54] SERVER APPARATUS, SUBSCRIBER APPARATUS AND INFORMATION ON DEMAND SYSTEM

[75] Inventor: Ryoichi Imanaka, Hirakata, Japan

[73] Assignee: Matsushita Electric Industrial Co., Ltd., Osaka, Japan

[21] Appl. No.: 503,604

[22] Filed: Jul. 18, 1995

[30] Foreign Application Priority Data

Jul. 19, 1994 [JP] Japan .................................. 6-166695

[51] Int. Cl.$^6$ ........................................................ H04N 7/16
[52] U.S. Cl. .......................... 348/7; 348/3; 348/5; 348/10; 348/12; 455/2; 455/6.2
[58] Field of Search ........................ 348/7, 12, 13, 348/10, 11, 1, 2, 3, 5; 455/2, 4.2, 5.1, 6.1, 6.3; 386/83, 94; 380/3, 4, 5; 360/15; H04N 7/16, 6/173

[56] References Cited

U.S. PATENT DOCUMENTS

| | | | |
|---|---|---|---|
| 3,679,813 | 7/1972 | Banning, Jr. | 178/5.1 |
| 4,528,589 | 7/1985 | Block et al. | 358/122 |
| 5,195,092 | 3/1993 | Wilson et al. | 370/94.2 |
| 5,491,820 | 2/1996 | Belove et al. | 395/600 |
| 5,504,933 | 4/1996 | Saito | 348/3 |

*Primary Examiner*—Christopher C. Grant
*Attorney, Agent, or Firm*—Ratner & Prestia

[57] ABSTRACT

An information on demand system provides a user of a terminal (subscriber) information through a network such as CATV such that the user pays an adequate charge to a server (information provider). According to the information on demand system, the received information can be recorded in a recording medium under control of the terminal equipment. Cases in which 1) the subscriber merely watches a program on a television receiver and; 2) the subscriber records the program and watches it by reproducing the recorded information at another time are distinguished and the subscriber is charged a different amount by the server accordingly.

13 Claims, 5 Drawing Sheets

SERVER APPARATUS, SUBSCRIBER APPARATUS AND INFORMATION ON DEMAND SYSTEM

BACKGROUND OF THE INVENTION

(1) Field of the Invention

The present invention relates to an information on demand system which provides information to subscribers through a CATV network and process improvement of a system in which subscribers pay charge to a server according to provided amount of information. Accordingly, in an information on demand system in accordance with the present invention, a plurality of different charging system are provided for every form which a subscriber utilizes the information.

(2) Description of the Prior Art

In an information on demand system such as CATV, an information provider (server) and users (subscribers) make contract each other, CATV cables are provided between the server and the subscribers and an information such as an audio/video signal is provided from the server to the subscribers. In this case, there is basically only one charging system and the charging system is that the server periodically collects the same amount of charge even if the subscriber records an audio/video information provided by the server in a video tape recorder (VTR, hereafter) or the like that at the subscriber (receiver) side or the subscriber merely listens/watches the same information by a television receiver without recording it in a VTR.

In the above-mentioned charging system, however, different charging systems can be set for the same CATV line.

Especially, since audio/video information becomes to be transmitted by a digital signal, if the audio/video information which is composed of a digital signal is recorded in a recording medium such as a digital video tape recorder (VTR), a copy which has no deterioration in audio/video quality compared with an audio/video information provided by the server can be obtained at the subscriber side. This is a problem from a view point of copyright protection.

SUMMARY OF THE INVENTION

An information on demand system in accordance with the present invention aims at making subscribers of CATV terminals pay adequate charge to a CATV server. It makes possible to control a recording/reproducing apparatus (ususlly called merely a recorder) and to record a received information in a recording medium. Using an information on demand system in accordance with the present invention, the subscribers can pay adequate charge to the server according to the purpose for which the subscribers use the received information.

To solve the above-mentioned problem, an information on demand system in accordance with the present invention includes an information providing apparatus for providing an audio/video information according to a subscriber's request; a display terminal for displaying the audio/video information provided by the information providing apparatus; and a recording/reproducing apparatus for recording the audio/video information provided by the information providing apparatus; and is composed so that a different amount is charged to the subscriber among the case in which only the information is displayed on a display terminal, the case in which the information is recorded in a recording/reproducing apparatus and the case in which not only the information is displayed on a display terminal but also the information is recorded in a recording/reproducing apparatus.

Therefore, in a charging system of the information on demand system in accordance with the present invention, because the CATV server can check whenever the subscriber records a program provided to a recording medium through a CATV cable, the CATV server can charge at every subscriber's recording. In actual, a terminal controller writes at every time when recording is made and the server can check anytime if necessary.

DETAILED DESCRIPTION OF THE INVENTION

An information on demand system in accordance with exemplary embodiments of the present invention is explained below referring to drawings.

(First Exemplary Embodiment)

Figure 1:
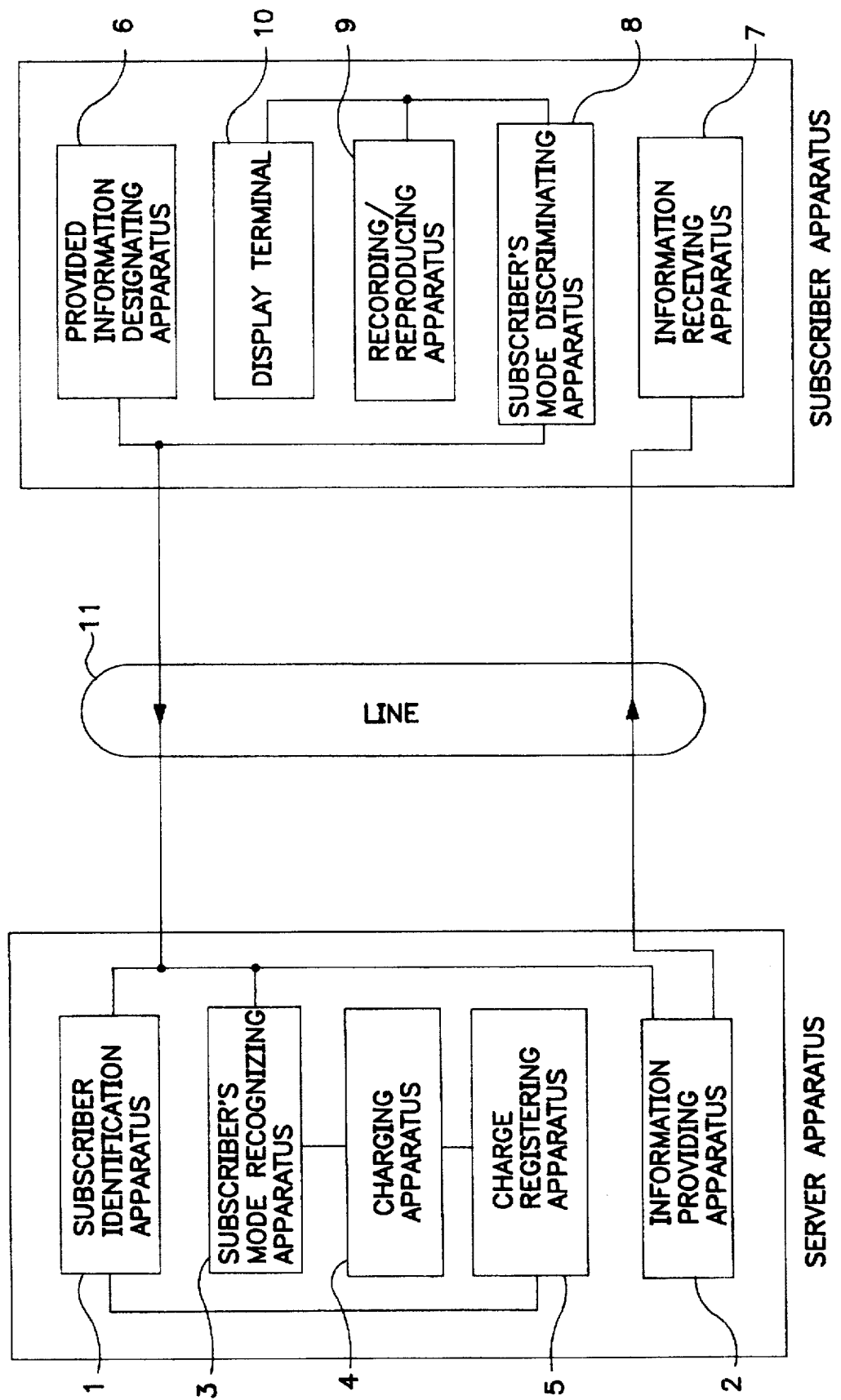
FIG. 1 is a block diagram of an information on demand system in accordance with a first exemplary embodiment of the present invention.

A block diagram of an information on demand system in accordance with a first exemplary embodiment of the present invention is shown in FIG. 1. The left side shows a block diagram of a server apparatus at a server side of the system. The block 1 is a subscriber identification apparatus for reading an identification number (ID number, hereafter) for identifying every individual subscriber. Block 2 is an information providing apparatus for providing information through a line 11. The information includes every information such as audio/video information such as movies, audio information such as music, town information showing what to see and where good restaurants are at sight-seeing spots and computer programs for games, etc.. Block 3 is a subscriber's mode recognizing apparatus for recognizing which the information is given to a subscriber's display terminal or a subscriber's recording/reproducing apparatus. Block 4 is a charging apparatus for charging a different amount between the case in which the audio/video information is given to the subscriber's display terminal and the case in which the audio/video information is given to the subscriber's recording/reproducing apparatus. Block 5 is a charge registering apparatus provided for every subscriber and each charge registering apparatus 5 corresponding to a subscriber provided with an audio/video information accumulates the amount corresponding to the output of charging apparatus 4 based an a subscriber's identification information identified at subscriber identification apparatus 1.

The right side of FIG. 1 shows a block diagram of a subscriber apparatus at a receiver side of the system. Block 6 is a provided information designating apparatus for reporting the information which the subscriber requests to the server. Block 7 is an informatiom receiving apparatus for receiving the information which is provided from the server according to a subscriber's request. Block 8 is a subscriber's mode discriminating apparatus for discriminating which the output signal of information receiving apparatus 7 is provided to the subscriber's display terminal or to the subscriber's recording/reproducing apparatus and reports the subscriber's ID number to the server through line 11. Block 9 is a recording/reproducing apparatus for recording the provided audio/video information outputted from subscriber's mode discriminating apparatus 8. Although an optical disc is used as a recording/reproducing medium in the exemplary embodiment, any medium which can record and reproduce such as magnetic recording medium and semiconductor device may be used. Block 10 is a display terminal for outputting the audio/video information provided by subscriber's mode discriminating apparatus 8 as a sound and picture. Although a cathode ray tube (CRT, hereafter) is used as a picture display device in the exemplary embodiment, all devices which transmits information to a subscriber through subscriber's five senses, such as a liquid chrystal display device, picture forming apparatus displaying information on a copyable medium like paper such as a printer can be used. The block 11 is a wired CATV line and anything which can transmit information such as wired lines like a telephone line and wireless means like satellite communication may be used.

The performance of an information on demand system composed as the above is explained below. In the exemplary embodiment, a CATV cable is used for line 11.

A subscriber designates an audio/video information which the subscriber wants to be provided through provided information designating apparatus 6. Provided information designating apparatus 6 transmits a subscriber's ID number and an ID number of a designated audio/video information to a server side through line 11. When the server apparatus receives the subscriber's ID number and the ID number of a requested audio/video information, subscriber identification apparatus 1 identifies the subscriber's ID number, judges whether the subscriber's ID number is registered. If the ID number is registered in the server side, the server outputs a signal to allow to provide the audio/video information to information providing apparatus 2 and if the ID number is not registered, the server outputs a signal to prohibit from providing the audio/video information to information providing apparatus 2.

Information providing apparatus 2 which was allowed to provide the audio/video information transmits the audio/video information which the subscriber had requested to information receiving apparatus 7 through line 11. Information receiving apparatus 7 demodulates (decodes) the received audio/video information. In the case in which the information signal is transmitted with a scrambled procedure, the signal is provided to subscriber's mode discriminating apparatus 8 after descrambling procedure. Subscriber's mode discriminating apparatus 8 outputs the audio/video information either to display terminal 10 such as a CRT or to recording/reproducing apparatus 9 according to the subscriber's request. At the same time, the subscriber's information is transmitted to subscriber's mode recognizing apparatus 3 at the server side through line 11.

Subscriber's mode recognizing apparatus 3 which received an information from the subscriber outputs the information to charging apparatus 4. Charging apparatus 4 is set so that the charging amount is larger when the audio/video information is provided to the subscriber's recording/reproducing apparatus 9 than when provided to the subscriber's display terminal 10 and outputs the charging amount to charge registering apparatus 5 according to the output of subscriber's mode recognizing apparatus 3. Charge registering apparatus 5 accumulates the charging amount provided from charging apparatus 4. The server can collect the charge from the subscriber every month according to the amount written in charge registering apparatus 5.

In the case of an audio/video information such as movies, because it is necessary to record an audio/video information for several hours by a digital signal, an optical disk is used as recording/reproducing apparatus 9 in the exemplary embodiment.

(Second Exemplary Embodiment)

Figure 2:
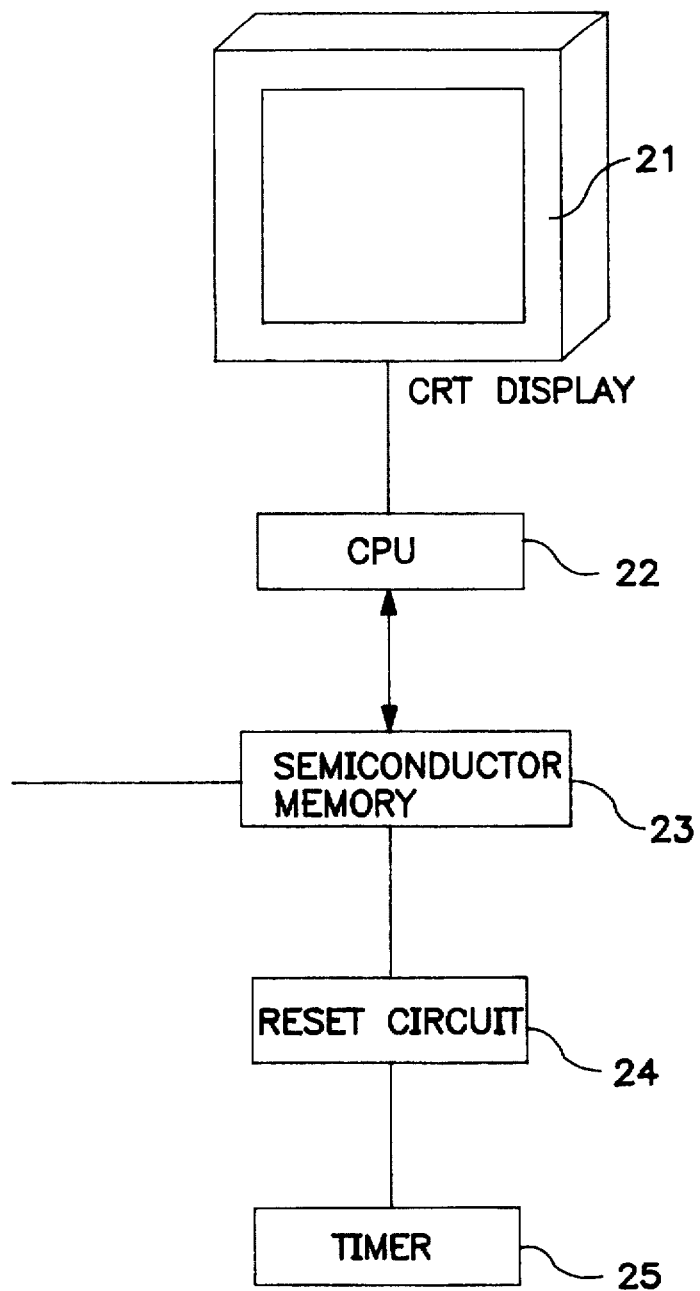
FIG. 2 is a block diagram of a display terminal used in an information on demand system in accordance with the first exemplary embodiment of the present invention.

An information on demand system in accordance with a second exemplary embodiment of the present invention is explained below referring to FIGS. 1 and 2. The blocks having similar functions to those in the first exemplary embodiment are numbered with the same reference numbers.

In FIG. 1, recording/reproducing apparatus 9 is a magnetic disk drive. Display terminal 10 includes a CRT 21, a central processing unit (CPU, hereafter) 22, a semiconductor memory 23, a reset circuit 24 and a timer 25 as shown in FIG. 2. Semiconductor memory 23 receives and writes an information transmitted from information providing apparatus 2 through subscriber's mode discriminating apparatus 8. CPU 22 executes a game according to an information from semiconductor memory 23. CRT 21 displays a picture corresponding to the execution result. Timer 25 outputs a signal at a designated time after the information is written in semiconductor 23. Reset circuit 24 resets and erases the information in semiconductor memory 23 according to the output signal of timer 25. A telephone line is used as a line 11.

The performance of the information on demand system is similar to that of the first exemplary embodiment. Because the information in semiconductor memory 23 of display terminal 10 is erased after a designated time, when the information is provided to display terminal 10, the subscriber can enjoy a game for the designated time.

According to such a configuration of the system, it is possible to change a charging system between the case in which only one game is made and the case in which a game software is provided to the subscriber.

(Third Exemplary Embodiment)

Figure 3:
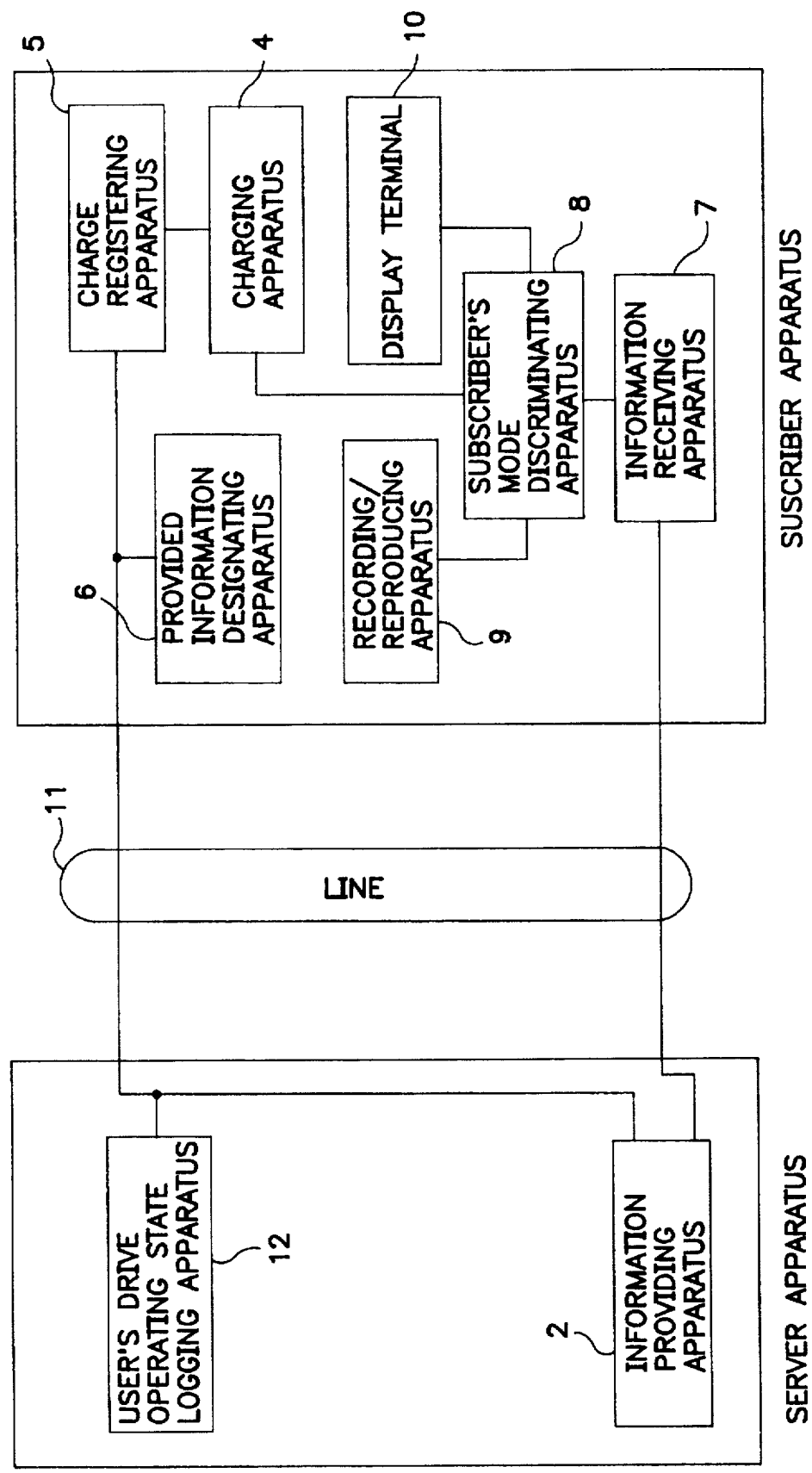
FIG. 3 is a block diagram of an information on demand system in accordance with a third exemplary embodiment of the present invention.

An information on demand system in accordance with a third exemplary embodiment of the present invention is shown in FIG. 3. The blocks having similar functions to those in the first exemplary embodiment are numbered with the same reference numbers. The left side shows a block diagram of a server apparatus of the system and the right side shows a block diagram of a subscriber apparatus of the system.

Block 12 is a user's drive operating state logging apparatus for collecting information concerning to a user's drive operating state and has a configuration to collect each subscriber's charge and to write the charge information for every subscriber.

Charging apparatus 4 and charge registering apparatus 5 are included in the subscriber apparatus. Charging apparatus 4 charges a different amount between the case in which an audio/video information is provided to display terminal 10 and the case in which the audio/video information is provided to recording/reproducing apparatus 9 according to the output of subscriber's mode discriminating apparatus 8. Charge registering apparatus 5 accumulates the charging amount according to the output of charging apparatus 4.

The subscriber designates the title name of the program which the subscriber requests through provided information designating apparatus 6. Provided information designating apparatus 6 transmits the requested title name and the ID number to the server side thorough line 11. When the server side receives the requested title name and the ID number, the server outputs a signal to allow to provide the audio/video information to information providing apparatus 2.

Then, information providing apparatus 2 transmits the audio/video information which the subscriber requested to be provided to information receiving apparatus 7 through line 11. Information receiving apparatus 7 outputs a signal to subscriber's mode discriminating apparatus 8 outputs the signal to either display terminal 10 or recording/reproducing apparatus 9 according to the subscriber's request. At the same time, subscriber's mode discriminating apparatus 8 outputs a signal specifying which the audio/video information is supplied to display terminal 10 or to recording/ reproducing apparatus 9 to charging apparatus 4. Charging apparatus 4 outputs a charge information from subscriber's mode discriminating apparatus 8 to charge registering apparatus 5. Charge registering apparatus 5 accumulates the subscriber's charge amount according to the output signal from charging apparatus 4.

User's drive operating state logging apparatus 12 collects the charge which is asn information concerning to the subscriber's ID number and the user's drive operating state at every month and from every subscriber and writes the charge information for every subscriber. The server can collect the accumulated amount based an the written charge information at every month from every subscriber.

According to the above-mentioned system, a different charging system from a usual charging system can be set when a copy is made without any deterioration in sound/ picture quality. Especially, when an analog signal is provided to display terminal 10 and a demodulated and descrambled digital signal is provided in recording/ reproducing apparatus 9 as they are, because an audio/video information having nearly same sound/picture quality as the server's software can be recorded in a recording medium provided in recording/reproducing apparatus 9 at the subscriber side, it is signaificant to provide multi charging systems.

Because it is not necessary to identify a subscriber's ID number at every time when the audio/video information is provided to the subscriber, the construction at the server side is simple and the time taken for providing information can be shortened.

A similar effect can be obtained by a construction that charge registering apparatus 6 periodically informs the subscriber's charge to the server by that the server periodically visits the subscriber and checks the charge displayed at the subscriber side, even if the system has no user's drive operating state logging apparatus 12 at the server side.

A construction without provided information designating apparatus 6 at the subscriber side can also set a different charging system from usual charging system when a copy without any quality deterioration in sound and picture is made.

(Fourth Exemplary Embodiment)

Figure 4:
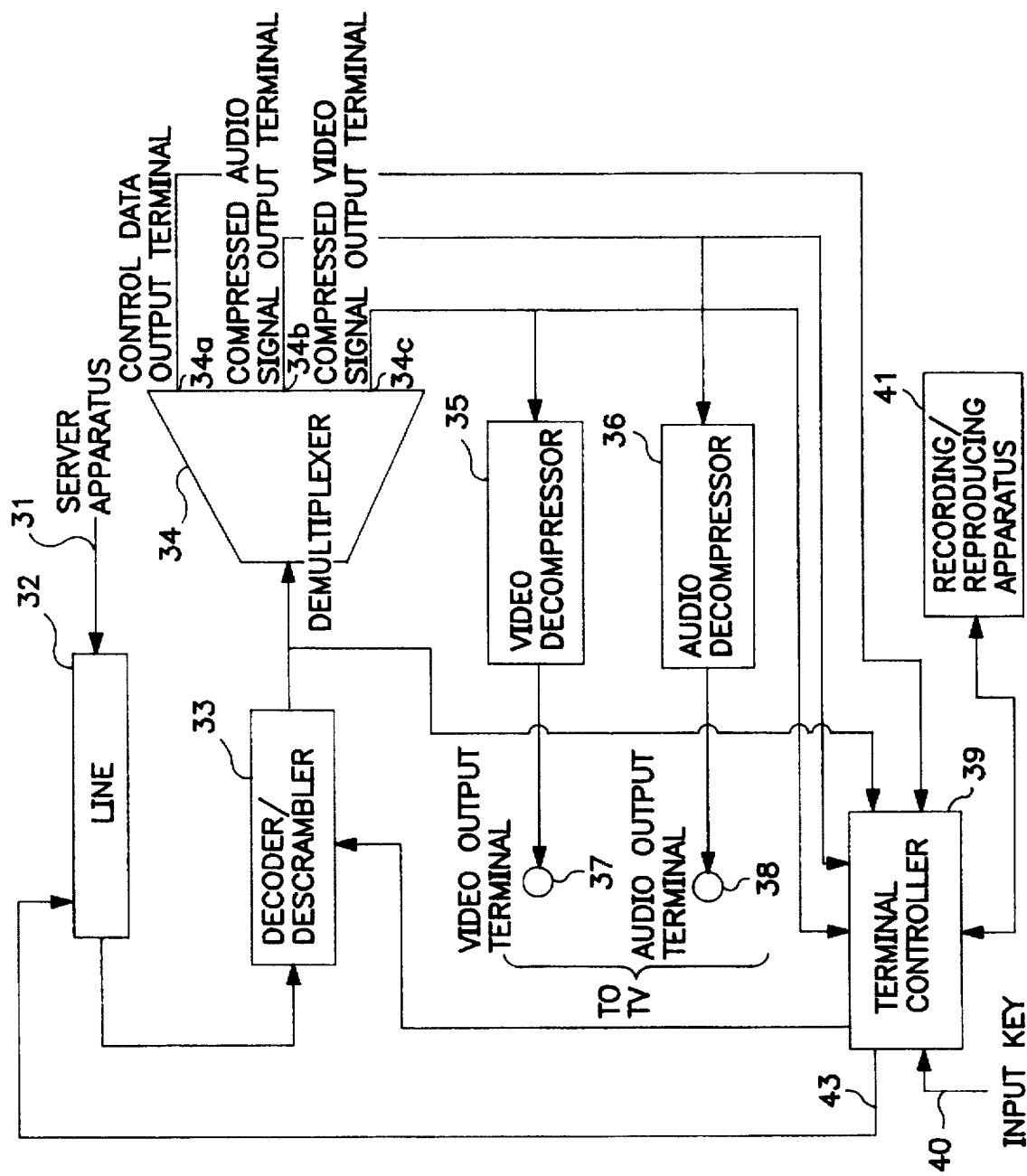
FIG. 4 is a block diagram of a subscriber apparatus used in an information on demand system in accordance with a fourth exemplary embodiment of the present invention.

A block diagram of a subscriber apparatus of an information on demand system in accordance with a fourth exemplary embodiment of the present invention is shown in FIG. 4.

Symbol 32 is a line for transmitting signals such as CATV audio/video information to subscribers. A server apparatus 31 transmits an audio/video information which is channel encoded (modulated) after being scrambled for secret to a subscriber side through line 32. The audio/video information supplied from server apparatus 31 is a bit-stream with a packeted digital form. A decoder/descrambler 33 has a decoding function for decoding an encoded signal provided from server apparatus 31 and a descrambling function for converting a scrambled signal to an original audio/video signal.

A demultiplexer 34 converts a packet signal outputted from decoder/descrambler 33 into a parallel signal. Terminals 34a, 34b and 34c are output terminals to output a control data, a compresssed audio signal and a compressed video signal, respectively. A video decompressor 35 decompresses the compressed video signal outputted from compressed video signal output terminal 34c into an original video signal. An audio decompressor 36 decompresses the compressed audio signal outputted from compressed audio signal output terminal 34b into an original audio signal. Terminal 37 is a video output terminal for supplying a video signal to a video signal input terminal of a television receiver and a VTR. Terminal 38 is an audio output terminal for supplying an audio signal to an audio signal input terminal of the television receiver and the VTR.

A terminal controller 39 manages the performance of the terminals by an input key 40 and a control data from control data output terminal 34a. An output of a recording/ reproducing apparatus 41 is supplied to terminal controller 39. That is, a receiver at the subscriber side includes a decoder/descrambler 33 which is a demodulator/ descrambler to demodulate and descramble an scrambled information transmitted from the server side, a terminal controller 39 which is supplied with an output signal of decoder/descrambler 33, outputs a signal to a recording/ reproducing apparatus 41 for recording an audio/video information in a recording medium in which a subscriber's ID number is written and controls supplying the output signal. Terminal controller 39 registers the subscriber's ID number which is written in a recording medium of recording/ reproducing apparatus 41 and the information ID number which is provided by the server when the subscriber finishes recording the audio/video information provided from the server in the recording medium of recording/reproducing apparatus 41.

Server apparatus 31 scrambles an audio/video information to provide to the subscriber for keeping secret, modulates (encodes) it to a form fitting line 32 and transmits the scrambled and modulated signal to the subscriber side through line 32. Decoder/descrambler 33 which has received the modulated signal through line 32 demodulates and descrambles the received signal and the output signal is released from scramble.

The performance when a provided audio/video information signal is outputted to a display terminal such as a television receiver is explained below.

The output signal of decoder/descrambler 33 is separated into a control data signal at demultiplexer 34 and the separated signals are outputted. The compressed audio signal outputted from output terminal 34b is converted into an original audio signal at audio decompressor 36, the compressed video signal outputted from output terminal 34c is converted into an original video signal at video compressor 35. As a compression method, for example, an MPEG method is used. The control data signal, the compressed video signal, the compressed audio signal from demultiplexer 34 and the output signal of decoder/descrambler 33 are inputted to terminal controller 39. Both the audio signal at terminal 34b and the video signal at terminal 34c are compressed digital bit-stream signals and they are supplied to recording/reproducing apparatus 41 via terminal controller 39. The audio/video information is recorded in the recording meadium by recording (writing) the compressed digital bit-stream at recording/reproducing apparatus 41.

Figure 5:
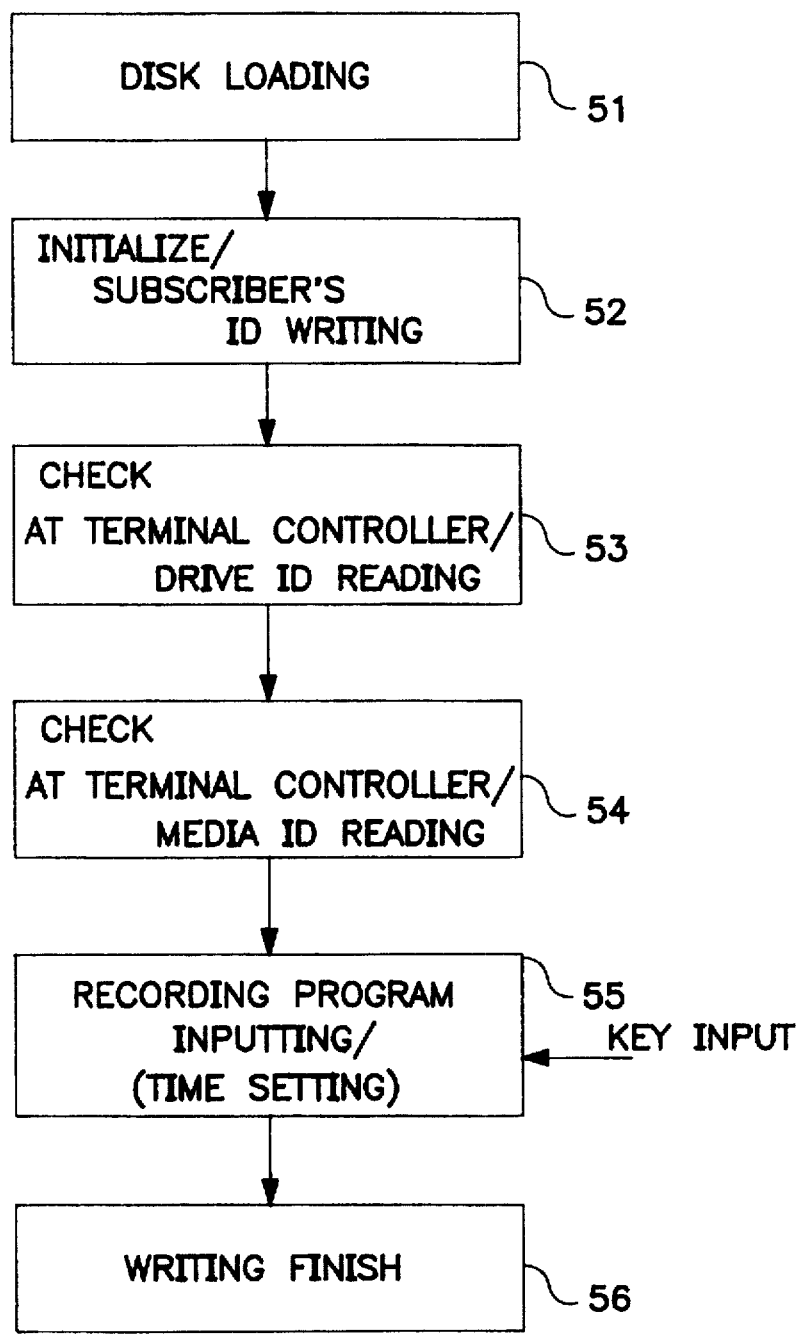
FIG. 5 is a flow chart of a writing/reading action of a subscriber apparatus used in an information on demand system in accordance with a fourth exemplary embodiment of the present invention.

The performance when a provided audio/video information signal is recorded and reproduced at recording/reproducing apparatus 41 is explained below, referring to a flow chart shown in FIG. 5.

Recording/reproducing apparatus 41 is controlled by terminal controller 39. As an interface between recording/reproducing apparatus 41 and terminal controller 39, for example, SCSI-2 (ANSI standard X3. 13-199X) is used.

A recording medium is loaded on recording/reproducing apparatus 41. (action 51 in FIG. 5)

A program which the subscriber wants to record is selected with input key 40 and a write command is given to terminal controller 39. A subscriber's ID number to identify the subscriber and a title name of the program which the subscriber wants to record are written in a recording medium of recording/reproducing apparatus 41. (action 52)

A recording/reproducing apparatus ID number to identify the recording/reproducing apparatus 41, the subscriber's ID number and the title name of the program are checked. (action 53)

When all the recording/reproducing apparatus ID number, the subscriber's ID number and the title name of the program are confirmed to be those already registered, recording in the recording medium starts with a following procedure.

When one or more than one of the recording/reproducing apparatus ID number, the subscriber's ID number and the title name of the program are confirmed not to be those already registered, terminal controller 39 informs to the subscriber that the recording/reproducing apparatus ID number, the subscriber's ID number or the title name of the program is wrong. (action 54)

Then, terminal controller 39 gives a command to start recording to recording/reproducing apparatus 41. When the program which the subscriber requests is inputted through line 32, recording/reproducing apparatus 41 starts recording. (action 55)

When recording/reproducing apparatus 41 finishes recording, the fact that the recording finished is registered in terminal controller 39. (action 56)

Thus, the CATV server can manage the subscriber's charge, if necessary.

The subscriber apparatus is composed so that both the video signal and the audio signal outputted from video output terminal 37 and audio output terminal 38, respectively, are outputted via terminal controller 39 as a compressed digital bit-stream and whether the ID number is written in the writing medium is checked at starting of recording and when the subscriber's ID number is not written, the audio/video information is not supplied to recording/reproducing apparatus 41. Therefore, unless all the recording/reproducing apparatus ID number, the subscriber's ID number and the title name of the recorded program are registered, the subscriber can neither record the audio/video information in recording/reproducing apparatus 41 nor watch the program on the television receiver (display terminal).

Although a subscriber is identified by using a subscriber's ID number in the fourth exemplary embodiment of the present invention, a unique ID number of the recording/reproducing apparatus itself may be used instead of the subscriber's ID number. Similar effect is obtained in an information on demand system that an owner of the write/read device is discriminated from the unique ID number of the recording/reproducing apparatus itself and the charge is collected from the owner of the recording/reproducing apparatus.

The system can be also composed so that the server registers the title name of the program for a particular program and when the subscriber wants to write the title name, the terminal controller can check at the terminal controller if the subscriber is requesting a server's approval.

The charging system can be made so that the information can be reproduced by only a recording/reproducing apparatus which was used to record the audio/video information and by any other reproducing apparatus. In this case, the system is composed so that the descramble apparatus is connected to an arbitrary reproducing apparatus, the descramble apparatus certifies whether the medium in which the information was written has an approved ID number and only when reading from the medium certified by the descramble apparatus, the descramble apparatus performs normally.

According to an information on demand system in accordance with exemplary embodiments of the present invention, when a copy without any deterioration of sound/picture quality is made, a different charging system from usual charge can be set. Especially, when an analog signal is outputted to a recording/reproducing apparatus as they are, an audio/video information having almost same quality as the server's information is recorded in a recording medium of the recording/reproducing apparatus and it is significant to provide with three charging systems.

Because programs and informations are always recorded/written in recording medium based on a subscriber's ID number and a recording/reproducing apparatus ID number, it is possible to restrict a recording/reproducing apparatus used at reproducing.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. An information on demand system comprising:

a server apparatus for providing information according to a request from a subscriber;

display means for displaying said information provided by said server apparatus; and recording means for recording said information provided by said server apparatus;

wherein a different amount is charged to said subscriber among a) in the case in which said information is provided to said display means, b) in the case in which said information is provided to said recording means and c) in the case in which said information is provided to said display means and to said recording means.

2. An information on demand system comprising:

information providing means for providing information according to a request from a subscriber;

information receiving means for receiving said information provided by said information providing means;

display means for displaying a further information signal output from said information receiving means;

recording means for recording said further information signal of said information receiving means;

subscriber mode discriminating means for discriminating whether said further information signal of said information receiving means is provided to one of said display means and said recording means;

charging means for charging a different amount among a) in the case in which said further information is provided to said display means, b) in the case in which said further information is provided to said recording means and c) in the case in which said further information is provided to said display means and to said recording means according to an output of said subscriber mode discriminating means; and, charge registering means for registering charge data output from said charging means.

3. A server apparatus comprising:

subscriber identification means for reading an identifying information to identify a subscriber;

information providing means for providing information according to a request from said subscriber;

subscriber mode recognizing means for discriminating whether said information providing means provides said information a) to a subscriber display means, b) to a subscriber recording means or c) to said subscriber display means and said subscriber recording means;

charging means for charging a different amount among a) in the case in which said information is provided to said subscriber display means, b) in the case in which said information is provided to said subscriber recording means and c) in the case in which said information is provided to said subscriber display means and to said subscriber recording means according to an output of said subscriber mode recognizing means; and charge registering means provided for every subscriber for registering a charge data output from said charging means; and wherein said charge registering means accumulates the charge data output from said charging means at said charge registering means corresponding to said identifying information according to a discriminating information discriminated at said subscriber identification means.

4. A server apparatus comprising:

provided information designating means for providing information requested by a subscriber to a server;

information receiving means for receiving said information provided by said server according to said subscriber request;

subscriber mode discriminating means for discriminating whether an information signal output from said information receiving means is provided a) to a display means, b) to a recording means or c) to both the display means and the recording means and informing said subscriber through said information receiving means.

5. A subscriber apparatus comprising:

information receiving means for receiving a provided information according to a request from a subscriber;

subscriber mode discriminating means for discriminating whether a further information signal output from said information receiving means is provided a) to a display means, b) to a recording means or c) to both said display means and said recording means;

charging means for charging a different amount among a) in the case in which said further information is provided to said display means, b) in the case in which said further information is provided to said recording means and c) in the case in which said further information is provided to said display means and to said recording means according to an output of said subscriber mode discriminating means; and charge registering means for accumulating an amount output from said charging means.

6. A subscriber apparatus as recited in claim 5; wherein the charge registering means periodically informs the subscriber's charge to a server.

7. A subscriber apparatus comprising:

demodulating means for demodulating an information signal provided by a server; and terminal control means for inputting a demodulated information signal of said demodulating means, outputting a signal to recording means which records said demodulated information signal in a recording medium in which a subscriber identification number is recorded and controlling supply of the output signal; and wherein said terminal control means registers said subscriber identification number recorded in said recording medium of said recording means and an information identification number provided from said server in said terminal control means, when a subscriber finishes the recording of the information signal provided from said server in said recording medium of said recording means.

8. A subscriber apparatus as recited in claim 7; wherein said demodulated information signal is not output to said recording means, when the subscriber identification number is not recorded in the recording medium of said recording means.

9. A subscriber apparatus as recited in claim 7 or 8; wherein an identification number of said recording means is used instead of the subscriber identification number.

10. A subscriber apparatus as recited in claim 9 wherein:

said subscriber is determined from the identification number of said recording means; and a charge is collected from said subscriber.

11. A subscriber apparatus as recited in claim 10 wherein when the subscriber records information provided from an information providing apparatus, said information can not be recorded unless the subscriber is approved by the server.

12. A method for providing information on demand comprising the steps of:

receiving a request from a subscriber requesting information;

transmitting the information to at least one of a subscriber display means and a subscriber recording means for displaying and recording the information respectively, and charging the subscriber one of a plurality of amounts depending upon whether the transmitted information is intended for recording on said recording means, wherein said request for information indicates whether the subscriber is recording said information on said recording means.

13. An apparatus for providing information on demand comprising:

receiving means for receiving a request from a subscriber for information, sending means for sending the information to at least one of a subscriber display means and a subscriber recording means for displaying and recording the information respectively, and charging means for charging the subscriber one of a plurality of amounts depending upon whether the transmitted information is intended for recording on said recording means, wherein said request for information indicates whether the subscriber is recording said information on said recording means.

* * * * *